United States Patent
Roome et al.

(10) Patent No.: US 7,835,031 B2
(45) Date of Patent: Nov. 16, 2010

(54) OUTPUT PURE COLOR TINTS OR BLACK FOR FULL-COLOR INPUT

(75) Inventors: David M. Roome, Livonia, NY (US); Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 850 days.

(21) Appl. No.: 11/690,522

(22) Filed: Mar. 23, 2007

(65) Prior Publication Data

US 2008/0231902 A1 Sep. 25, 2008

(51) Int. Cl.
*G06K 15/02* (2006.01)

(52) U.S. Cl. ............................. 358/1.9; 358/2.1; 358/296

(58) Field of Classification Search .................. 358/1.9, 358/2.1, 296; 715/526
See application file for complete search history.

(56) References Cited

U.S. PATENT DOCUMENTS

| 4,761,669 A | 8/1988 | Langdon |
| 4,903,048 A | 2/1990 | Harrington |
| 5,237,517 A | 8/1993 | Harrington et al. |
| 5,568,248 A * | 10/1996 | Wagley ........................ 399/156 |
| 5,668,636 A * | 9/1997 | Beach et al. ................. 358/296 |
| 6,426,802 B1 * | 7/2002 | Lin ............................ 358/1.9 |
| 6,718,878 B2 * | 4/2004 | Grosso et al. ............... 101/484 |
| 7,340,205 B2 * | 3/2008 | Nagao et al. ................. 399/296 |
| 2002/0089514 A1 * | 7/2002 | Kitahara et al. ............. 345/600 |
| 2005/0050465 A1 * | 3/2005 | Horton et al. ................ 715/526 |
| 2007/0046957 A1 * | 3/2007 | Jacobs et al. ................. 358/1.9 |

* cited by examiner

*Primary Examiner*—King Y Poon
*Assistant Examiner*—Allen H Nguyen
(74) *Attorney, Agent, or Firm*—Oliff & Berridge, PLC

(57) ABSTRACT

A method and device for printing a full color image containing at least one object onto a highlight color printer without mixing highlight color and black for any one object. Inputting a full color image containing at least one object to be printed onto a highlight color printer. The highlight color printer prints each object of the full color image as an object containing only highlight color or only black while maintaining luminance of the original full color image.

10 Claims, 3 Drawing Sheets

OUTPUT PURE COLOR TINTS OR BLACK FOR FULL-COLOR INPUT

BACKGROUND

Color images are a significant element in today's printing industry. As a result, electronic color printers and color image creation tools have been increasingly developed to obtain color images using electronic printing methods. Much of the color printing is performed using full color, the gamut of colors including tints and shades of the full color spectrum—reds, greens, blues and their combinations.

A significant amount of color printing, however, can be performed using a highlight color. In this type of printing, only two inks are used in the printing process. These inks comprise black and a highlight color (usually red or blue or a custom color). Electronic printers may be designed specifically for highlight color printing. The highlight color printer is generally faster and less expensive than the full color printers because only two inks are processed as opposed to the three or four inks, which must be processed in order to obtain full color images.

The gamut of full colors is a three-dimensional volume which can be represented by a double hexagonal cone. In this representation, shades vary from dark to light as one moves upwards vertically. Tints vary from unsaturated grays to fully saturated colors as one moves out radially. Hues vary as one moves angularly in the horizontal plane.

The gamut of colors available to a highlight printer can be represented by a two-dimensional triangle sliced from the full color double hexagonal cone at the angle of the highlight hue.

Prior attempts to print a full color image on a highlight color printer involved mapping the three-dimensional double hexagonal cone to the two-dimensional triangle. The printer rendered the highlight color image by mapping the full color specification into a limited set of colors that it could produce. In such a mapping, many different colors in the full color space were mapped to the same color in the highlight color space. Information important to the viewer was often lost.

The related art has disclosed printing systems which attempt to provide color images.

Harrington U.S. Pat. No. 4,903,048 discloses color imaging using ink pattern designs in conjunction with registered two-color imaging to form simulated color images. A printing apparatus is described which is used to perform the two-color imaging.

Langdon U.S. Pat. No. 4,761,669 discloses an electrophotographic highlight color printing machine in which printing is done in at least two different colors. Methods for transferring multiple color images simultaneously are disclosed.

While the related art attempts to map a full color image to a highlight color image, it does not recognize that certain information from the full color image should be preserved depending upon how the color is being used and what type of image is being created.

SUMMARY

Any number of colors can be created when two colors are mixed together within the colored cone. One problem that may occur by putting in the xerographic components separately is that the black toner gets laid down first, and then the color xerographic component gets laid down. Thus, there is an added difficulty in trying to line up the color and the black images perfectly. In other words, it is difficult to get perfect registration between the color and black toner. Thus, any objects including images, graphics and text that customers incorporate into the full color document should be monochromatic, meaning either color or black toner is used. Otherwise, when printing a full color document on a highlight color printer, output problems due to the registration error of the highlight color and black occur.

Accordingly, the exemplary embodiments address or solve the above noted problems, and other issues, by providing printing of full color images to a highlight color printer without mixing black and the highlight color, while still printing color information that is important to the viewer.

In another exemplary embodiment a full color image is printed on a highlight color printer without mixing black and highlight color such that different information is preserved in accordance with the type of image created.

To achieve the foregoing and other objects and to overcome the shortcomings discussed above, a mapping of full color images to highlight color images is provided in which information important to the viewer is preserved without mixing black and highlight color on the print output. Each object of the full color image is separately analyzed and converted into an intermediate color space image, e.g. Hue Saturation and Value (HSV), Grayscale, and mixed highlight color and black. Then, the intermediate image format is processed into purely highlight color (e.g., a pure color tint) or black based on the importance of the object. Then, the processed objects are printed to represent the full color document where each object contains only highlight color or black.

DETAILED DESCRIPTION OF THE PREFERRED EMBODIMENTS

A full color document contains objects represented by multiple colors. For example, a full color document contains a mixture of red, green and blue colors. Printing a full color document in full color is very costly. Customers can save a great deal of money and time outputting their documents on more inexpensive and faster highlight color printers. These printers, however, have reduced functionality. For example, they print in one highlight color, usually red or blue, and black. In another exemplary embodiment, the highlight color printer may print in a highlight color and a non-highlight color. For example, the highlight color printer may use red as the highlight color and blue as the non-highlight color. The exemplary embodiments address or solve a highlight color and black registration problem and other problems by outputting each object within the full color document as highlight color only or black only. Thus, there is no mixture between the highlight color and black. The end user is allowed to enjoy documents from their highlight color printer without altering their full color document and without any blurriness caused by registration problems when black and highlight color are mixed together.

Figure 1:
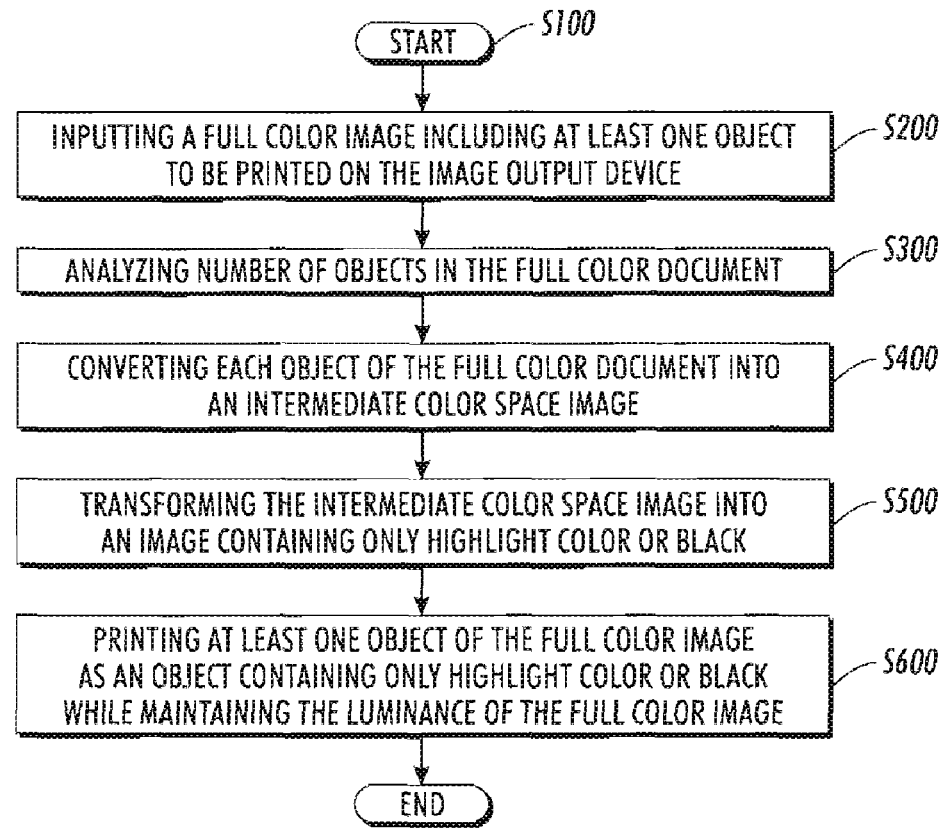
FIG. 1 illustrates a flow chart for generically converting a full color image into print output containing only highlight color or black.
Figure 2:
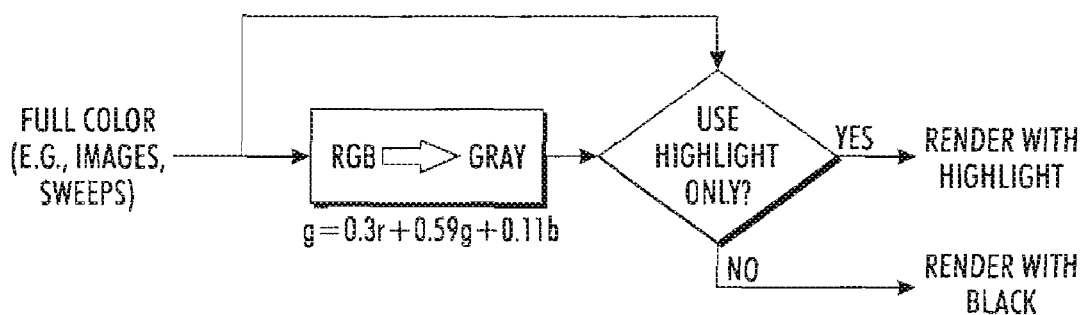
FIG. 2 illustrates an exemplary embodiment for converting a full color document containing images and sweeps into a grayscale image and then rendering the grayscale image with only highlight color or black.

FIG. 1 illustrates a method for printing a full color document which includes at least one object onto a highlight color printer without mixing highlight color and black for any single object while preserving luminance of the input color.

The method begins at S100, the starting point and then proceeds to S200. As shown at S200, the input of a full color document may contain numerous images, sweeps, graphics and text, alone or in any combination. The document may be composed of numerous different colors, such as red, green and blue, and also may include black and white. The document may be composed of several objects or one big image. The division of the document is determined by the nature of the document. Some documents may only contain one object and other documents may contain multiple objects. Each object is analyzed separately. In another example, a pie chart may consist of multiple pieces where each piece of the pie represents a different object. However, the exemplary embodiments are not limited to the disclosed methods of analyses and can accommodate other methods.

The exemplary methods disclosed include a pictorial algorithm, a presentation algorithm, and a color to highlight algorithm. These algorithms are illustrative of possible methods of analyses. The full color document will ultimately be output onto a highlight color printer containing both highlight color and black. However, each object processed will be printed in either pure highlight color only or black only. The various algorithms to be used to process each object use different threshold points to define when to represent the object in highlight color or black. The threshold point may be predefined or the user may adjust the threshold point.

As shown at S300, the number of objects in the full color document is determined. The nature of the objects in the documents relate to the algorithm used to convert the full color document. For example, the pictorial algorithm is preferably used for images and sweeps. Generally, these images and sweeps cover the entire document, and thus, the document is treated as one object. However, the presentation algorithm, preferably used for graphics objects and line art, treats each object separately. The color to highlight algorithm, preferably used for text and graphics, will break up the text and graphics into separate objects before performing the analysis.

Each object of the full color document is converted into an intermediate color space image after the number of objects in the documents has been determined, as shown in S400. Each intermediate image preserves the luminance of the original input color document. The pictorial algorithm may convert the full color object into a grayscale color space image during S400. The presentation algorithm may convert the full color object into an image containing a mixture of highlight color and black during S400. In yet another exemplary embodiment, the color to highlight algorithm may convert the full color object into a grayscale image as performed in the pictorial algorithm, but then after further analysis, the grayscale image may be converted to a Hue Saturation and Value (HSV) color space image. Thus, the intermediate color space image may be a HSV image, a grayscale image or a highlight color and black image where highlight color and black are mixed together. The exemplary embodiments are not limited to these intermediate color space images and can support numerous other intermediate color space image formats.

The intermediate color space image may be converted into an object containing only highlight color or only black after analyzing the intermediate color space image, as shown at S500. Various examples of methods for analysis will be discussed below.

Figure 3:
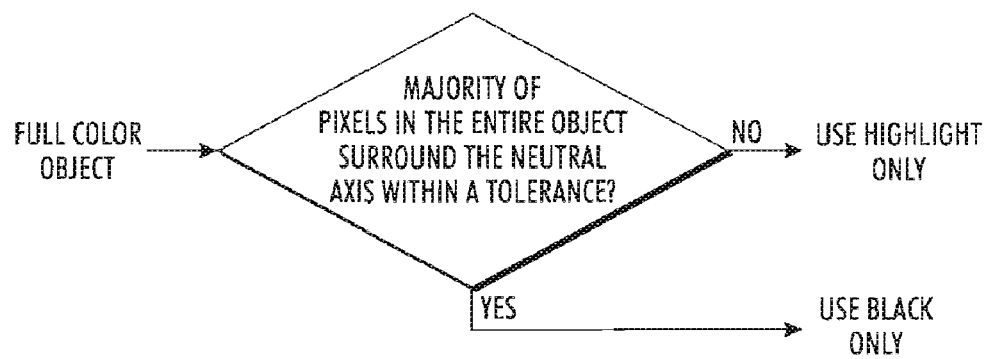
FIG. 3 illustrates an exemplary embodiment detailing the analysis for converting the intermediate grayscale image into an image containing only highlight color or black based on the luminance of the input image.

For full color documents containing images and sweeps, the intermediate image may arrive as a grayscale image. The grayscale image is converted to highlight color or black only through various different analyses. The embodiment of FIG. 3 illustrates one method of converting the grayscale image into highlight color or black only. The grayscale image maintains the luminance of the original full color document. The exemplary embodiment of FIG. 3 begins by determining if a majority of the pixels of the object have a luminance near the neutral axis within a tolerance. If the majority of the pixels have a neutral luminance within a tolerance, then the full color object is rendered in black only. However, if the luminance of the majority of the pixels in the entire object is not within the neutral axis within a tolerance then the algorithm will render that object with pure highlight color only. In other words, if an object's luminance is non-neutral and outside of the tolerance then the object will be rendered in pure highlight color only; otherwise, it will be rendered in black only.

Figure 4:
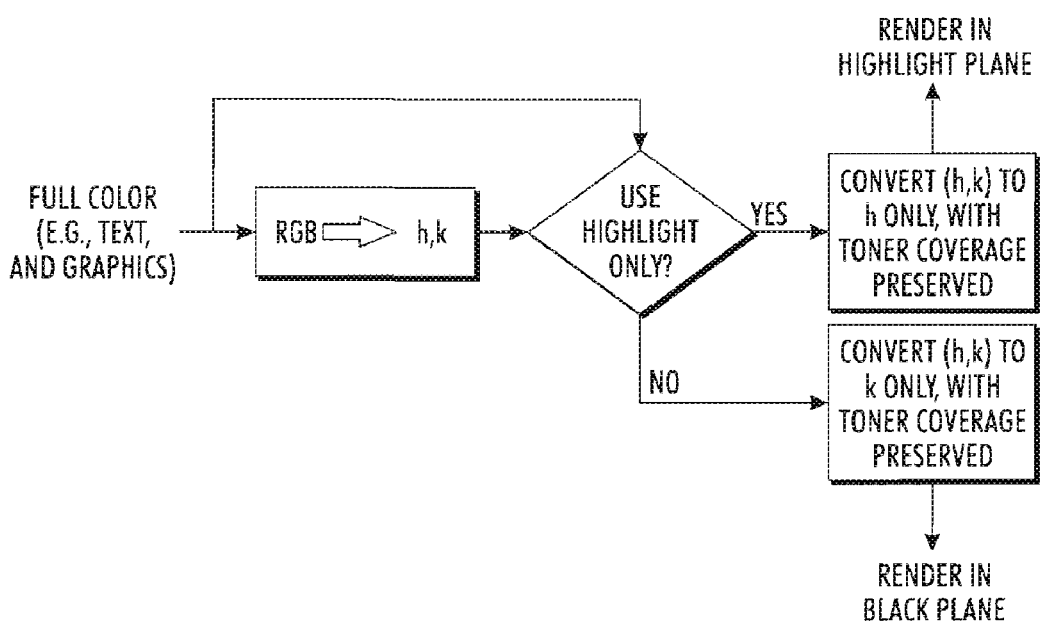
FIG. 4 illustrates an exemplary embodiment for converting a full color image containing graphics and line art into a highlight color and black color space intermediate image where the highlight color and black may be mixed followed by converting the image into a pure highlight color or a pure black document where highlight color and black are not mixed.

For full color documents containing color graphics and line art, the presentation algorithm may be used as illustrated in FIG. 4. The algorithm converts the input to an intermediate color space document containing a mixture of highlight color and black. This conversion better preserves the total tonal coverage in the intermediate color in the highlight color and black space. The algorithm emphasizes an input color that is closer to the mapping color. Thus, for objects that are close to the highlight color, those objects are rendered in pure highlight color only. Otherwise, the objects are rendered in black only. In another embodiment, all (non-black) objects that contain color then become rendered in pure highlight color only without any black.

Figure 5:
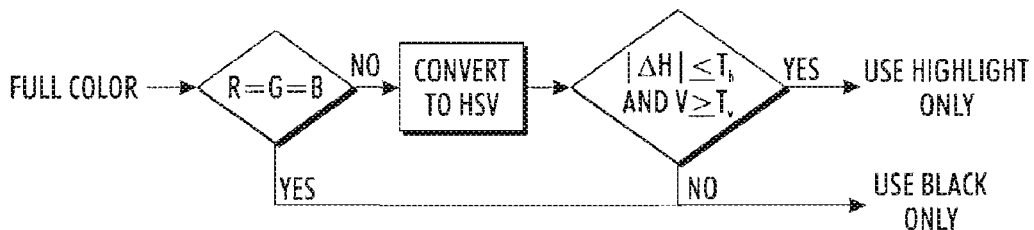
FIG. 5 illustrates an exemplary embodiment for converting a full color image containing a mixture of text and graphics into a grayscale image and then converting the grayscale image into a Hue Saturation and Value (HSV) color space image followed by converting an image containing only highlight color or black based on the hue difference and brightness value.

For full color documents containing text and/or graphics, the color to highlight algorithm may be used as illustrated in FIG. 5. The algorithm first checks if the full color input object is neutral in luminance as shown in the illustration of FIG. 3. If the object falls within the neutral zone then the object is rendered with black only as shown in FIG. 3. If the object falls outside the neutral zone, then the color to highlight algorithm adds an additional step. The intermediate grayscale image is converted to an image in the HSV color space. The algorithm checks the hue and brightness values in the HSV space and compares the hue difference versus a hue threshold and the brightness value versus a brightness threshold value. For example, certain hue differences and brightness values will yield color that allows the image to be converted to highlight color only, but for images that are darker or further away from the hue, these images may be mapped to black only. Furthermore, the threshold value for the hue difference and the threshold for the brightness value are configurable by the user. Preferably, the hue difference is less than or equal to 60° and the brightness value is greater than or equal to 0.5.

Finally, after all the objects are converted into a pure highlight color tint only or a black only object, all the objects may be reassembled into a single document, as shown at S600. Then the document may be printed out on a highlight color printer where each object of the original full color document may now be represented by pure highlight color only or black only while the luminance of the original full color document is maintained.

Figure 6:
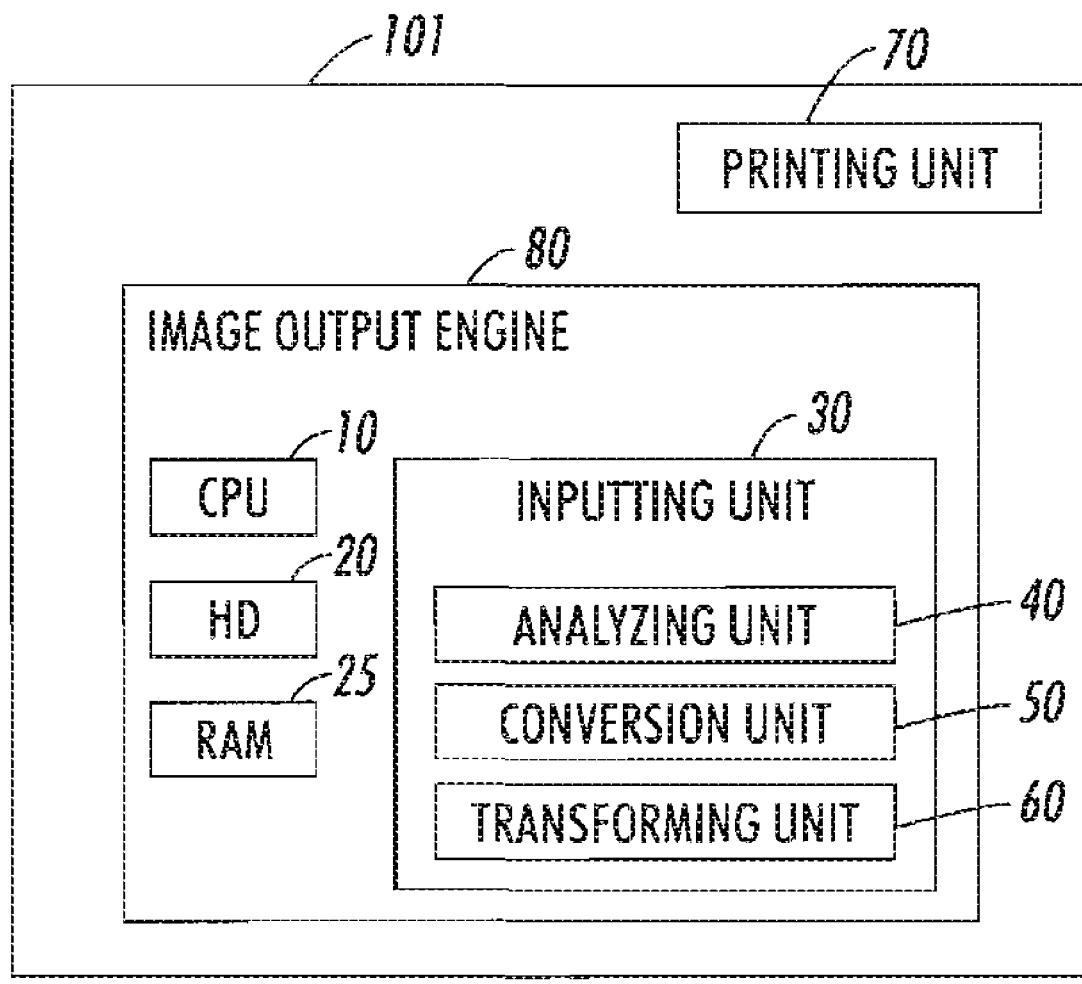
FIG. 6. illustrates a system containing an image output engine to convert a full color image into highlight only or black only print output.

A system 101 includes a CPU 10, a hard drive (HD) 20 and Random access memory (RAM) 25 for mapping a full color image on a highlight color image output device without mixing highlight color and black for any single object, as shown in FIG. 6. The system 101 also includes an image output engine 80 which includes an inputting unit 30 for inputting a full color image. The image to be printed on a highlight color image output device includes at least one object. The inputting unit 30 contains an analyzing unit 40 for analyzing the number of objects contained in the full color image. The inputting unit 30 also contains a conversion unit 50 for converting the object of the full color image into an intermediate color space image. The inputting unit 70 contains a transforming unit 60 to transform the at least one object from an intermediate color space image to a highlight color or black only image. The printing unit 70 then prints the at least one object to be printed out on a highlight color image output device on media such as paper.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of mapping a full color image producible on a highlight color image output device without mixing highlight color and black for any single object, the method comprising:
   inputting a full color image including at least one object to be printed in black and at least one object to be printed in highlight color on the highlight color image output device, the at least one objects being defined by a plurality of pixels;
   converting each object of the full color input image into an intermediate color space image that maintains luminance of the full color image;
   transforming each object from the intermediate color space image to render each object of the full color image as an object containing only pure highlight color or black while maintaining the luminance of the full color image; and
   printing with the highlight color image output device the at least one object in black and the at least one object in highlight color in an output image on an image forming medium,
   wherein the transforming renders an object of the at least one object in black only when a majority of the pixels of the object have a luminance close to neutral within a tolerance.

2. The method as claimed in claim 1, further comprising analyzing a number of objects in the full color image.

3. The method as claimed in claim 1, wherein the intermediate color space image is in any one of the following: Grayscale, HSV and mixed highlight color and black.

4. The method as claimed in claim 1, wherein the transforming is based on user input.

5. A system of mapping a full color image producible on a highlight color image output device without mixing highlight color and black for any single object, the system comprising:
   means for inputting a full color image including at least one object to be printed in black and at least one object to be printed in highlight color on the highlight color image output device, the at least one objects being defined by a plurality of pixels;
   means for converting each object of the full color input image into an intermediate color space image that maintains luminance of the full color image;
   means for transforming each object from the intermediate color space image to render each object of the full color image as an object containing only pure highlight color or black while maintaining the luminance of the full color image; and
   means for printing with the highlight color image output device the at least one object in black and the at least one object in highlight color in an output image on an image forming medium,
   wherein the means for transforming renders an object of the at least one object in black only when a majority of the pixels of the object have a luminance close to neutral within a tolerance.

6. The system as claimed in claim 5, further comprising means for analyzing a number of objects in the full color document.

7. The system as claimed in claim 5, wherein the intermediate color space image is in any one of the following: Grayscale, HSV and mixed highlight color and black.

8. The system as claimed in claim 5, wherein the means for transforming is based on user input.

9. A method of mapping a full color image producible on a highlight color image output device without mixing highlight color and black for any single object, the method comprising:
   inputting a full color image including at least one object to be printed in black and at least one object to be printed in highlight color on the highlight color image output device, the at least one objects being defined by a plurality of pixels;
   converting each object of the full color input image into an intermediate color space image that maintains luminance of the full color image;
   transforming each object from the intermediate color space image to render each object of the full color image as an object containing only pure highlight color or black while maintaining the luminance of the full color image; and
   printing with the highlight color image output device the at least one object in black and the at least one object in highlight color in an output image on an image forming medium,
   wherein the intermediate color space image is a Hue Saturation and Value color space, and the transforming renders each object based on hue difference and brightness values.

10. A system of mapping a full color image producible on a highlight color image output device without mixing highlight color and black for any single object, the system comprising:
    means for inputting a full color image including at least one object to be printed in black and at least one object to be printed in highlight color on the highlight color image output device, the at least one objects being defined by a plurality of pixels;
    means for converting each object of the full color input image into an intermediate color space image that maintains luminance of the full color image;
    means for transforming each object from the intermediate color space image to render each object of the full color image as an object containing only pure highlight color or black while maintaining the luminance of the full color image; and means for printing with the highlight color image output device the at least one object in black and the at least one object in highlight color in an output image on an image forming medium, wherein the intermediate color space image is a Hue Saturation and Value color space, and the means for transforming renders each object based on hue difference and brightness values.

* * * * *